(12) United States Patent
Kim et al.

(10) Patent No.: US 8,767,281 B2
(45) Date of Patent: Jul. 1, 2014

(54) FLAT PANEL DISPLAY APPARATUS

(75) Inventors: Jae-Kyoung Kim, Yongin (KR); Min-Woo Kim, Yongin (KR); Soo-Min Baek, Yongin (KR); Il-Nam Kim, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 155 days.

(21) Appl. No.: 13/343,151

(22) Filed: Jan. 4, 2012

(65) Prior Publication Data

US 2013/0057944 A1    Mar. 7, 2013

(30) Foreign Application Priority Data

Sep. 7, 2011    (KR) .................. 10-2011-0090740

(51) Int. Cl.
*G02B 26/00*    (2006.01)

(52) U.S. Cl.
USPC ........................................................ 359/296

(58) Field of Classification Search
USPC ..................... 359/296; 345/92, 107
See application file for complete search history.

(56) References Cited

U.S. PATENT DOCUMENTS

| | | | |
|---|---|---|---|
| 6,525,865 B2* | 2/2003 | Katase | 359/296 |
| 7,382,521 B2* | 6/2008 | Chopra et al. | 359/296 |
| 7,808,696 B2* | 10/2010 | Lee et al. | 359/296 |
| 2008/0024430 A1 | 1/2008 | Roh | |
| 2009/0135468 A1 | 5/2009 | Park | |
| 2010/0165447 A1 | 7/2010 | Komatsu et al. | |
| 2010/0188731 A1 | 7/2010 | Kanematsu et al. | |

FOREIGN PATENT DOCUMENTS

| | | |
|---|---|---|
| JP | 2001-235771 | 8/2001 |
| JP | 2008-224765 | 9/2008 |
| KR | 10-2005-0110392 A | 11/2005 |
| KR | 10-2008-0010144 | 1/2008 |
| KR | 10-2009-0054278 | 5/2009 |

* cited by examiner

*Primary Examiner* — Tuyen Tra

(74) *Attorney, Agent, or Firm* — Lee & Morse, P.C.

(57) ABSTRACT

A flat panel display apparatus includes a first substrate; a second substrate disposed facing the first substrate, barrier walls disposed between the first substrate and the second substrate and partitioning unit pixels, first electrodes disposed on a surface of the first substrate facing the second substrate and located in the respective unit pixels, black matrices disposed on the surface of the second substrate facing the first substrate and corresponding to the barrier walls, second electrodes disposed in regions corresponding to the black matrices between the first substrate and the second substrate, and an electrophoretic dispersion solution disposed in the unit pixels and comprising charged pigment particles and a fluid in which the charged pigment particles are dispersed.

16 Claims, 5 Drawing Sheets

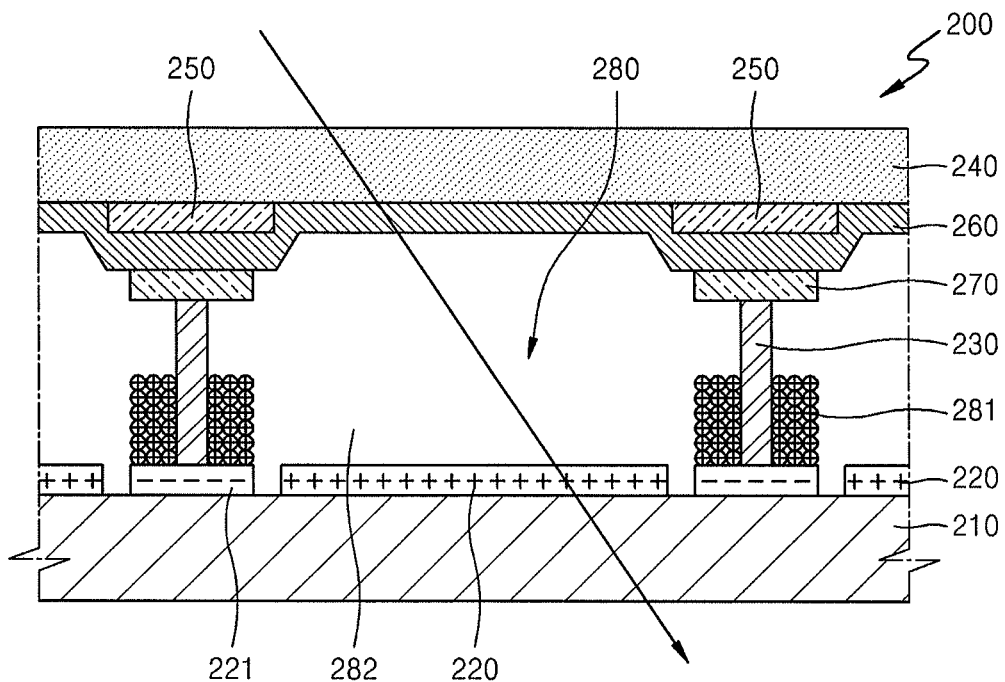
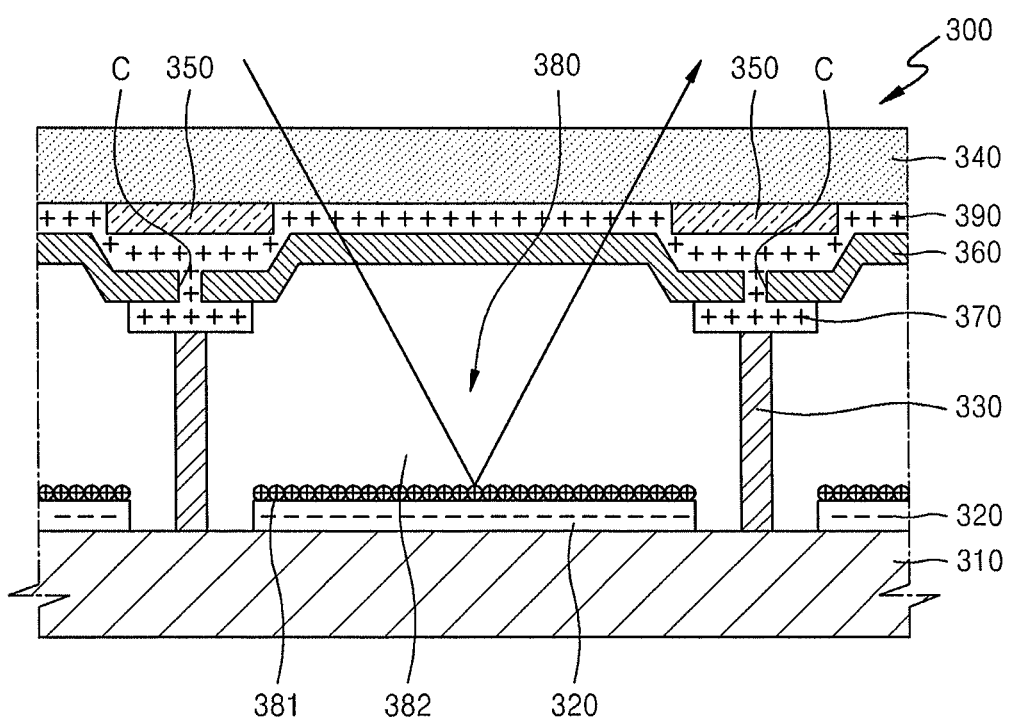

FLAT PANEL DISPLAY APPARATUS

CROSS-REFERENCE TO RELATED PATENT APPLICATION

This application claims the benefit of Korean Patent Application No. 10-2011-0090740, filed on Sep. 7, 2011, in the Korean Intellectual Property Office, the disclosure of which is incorporated herein in its entirety by reference.

BACKGROUND OF THE INVENTION

1. Field of the Invention

Embodiments relate to a flat panel display apparatus, and more particularly to, a flat panel display apparatus capable of selectively implementing a reflection mode and a transmission mode.

2. Description of the Related Art

Electrophoretic display apparatuses use electrophoretic cells including a dispersion solution in which charged pigment particles are dispersed to display images. Electrophoretic display apparatuses, which use an electrophoretic phenomenon in which charged pigment particles move by a electric field, are spotlighted as next generation display apparatuses with wide viewing angles, high reflectivity, good readability, low power consumption, and capability of easy flexibility without using a backlight. The electrophoretic display apparatuses, which may be used to replace paper printouts and conventional display devices, have wide ranging applications in terms of concepts such as e-paper, e-books, and the like, and thus, are being researched in various fields.

SUMMARY OF THE INVENTION

According to an embodiment of the present invention, there is provided a flat panel display apparatus including a first substrate; a second substrate disposed facing the first substrate; barrier walls disposed between the first substrate and the second substrate and partitioning unit pixels; first electrodes disposed on a surface of the first substrate facing the second substrate and located in the respective unit pixels; black matrices disposed on the surface of the second substrate facing the first substrate and corresponding to the barrier walls; second electrodes disposed in regions corresponding to the black matrices between the first substrate and the second substrate; and an electrophoretic dispersion solution disposed in the unit pixels and including charged pigment particles and a fluid in which the charged pigment particles are dispersed.

The second electrodes may be disposed between the black matrices and the barrier walls.

Widths of the second electrodes may be smaller than widths of the black matrices.

The flat panel display apparatus may further include third electrodes disposed on regions of the first substrate corresponding to the black matrices and spaced apart from the first electrodes.

The flat panel display apparatus may further include an insulating layer disposed on an overall surface of the second substrate to cover the black matrices.

The flat panel display apparatus may further include fourth electrodes disposed between the insulating layer and the second substrate.

The second electrodes and the fourth electrodes may be electrically connected to each other.

The first substrate and the second substrate may be transparent substrates.

The first electrodes may be transparent electrodes.

The second electrodes may be metal electrodes.

The fourth electrodes may be transparent electrodes.

Horizontal cross-sections of the barrier walls may have a mesh structure. The second electrodes may be disposed corresponding to the barrier walls. A common voltage may be applied to at least a portion of the second electrodes.

Horizontal cross-sections of the barrier walls may have hexagonal shapes. The black matrices and the second electrodes may be disposed in the regions corresponding to the barrier walls.

The first substrate may include thin film transistors (TFTs) respectively provided in each unit pixel and electrically connected to the first electrodes. The TFTs may be disposed corresponding to boundary regions of the unit pixels.

The black matrices and the second electrodes may be disposed in regions corresponding to the TFTs.

The first substrate may include TFTs respectively provided in each unit pixel and electrically connected to the first electrodes, wherein the TFTs are disposed corresponding to center portions of the unit pixels.

The black matrices and the second electrodes may be disposed in regions corresponding to the TFTs.

BRIEF DESCRIPTION OF THE DRAWINGS

The above and other features will become more apparent by describing in detail embodiments thereof with reference to the attached drawings in which:

FIG. 4 is a schematic cross-sectional diagram of a flat panel display apparatus according to another embodiment;

FIG. 5 is a schematic cross-sectional diagram of a flat panel display apparatus according to another embodiment;

DETAILED DESCRIPTION OF THE INVENTION

Embodiments will now be described more fully with reference to the accompanying drawings, in which various exemplary embodiments are shown.

As used herein, the term "and/or" includes any and all combinations of one or more of the associated listed items. Expressions such as "at least one of," when preceding a list of elements, modify the entire list of elements and do not modify the individual elements of the list.

Figure 1:
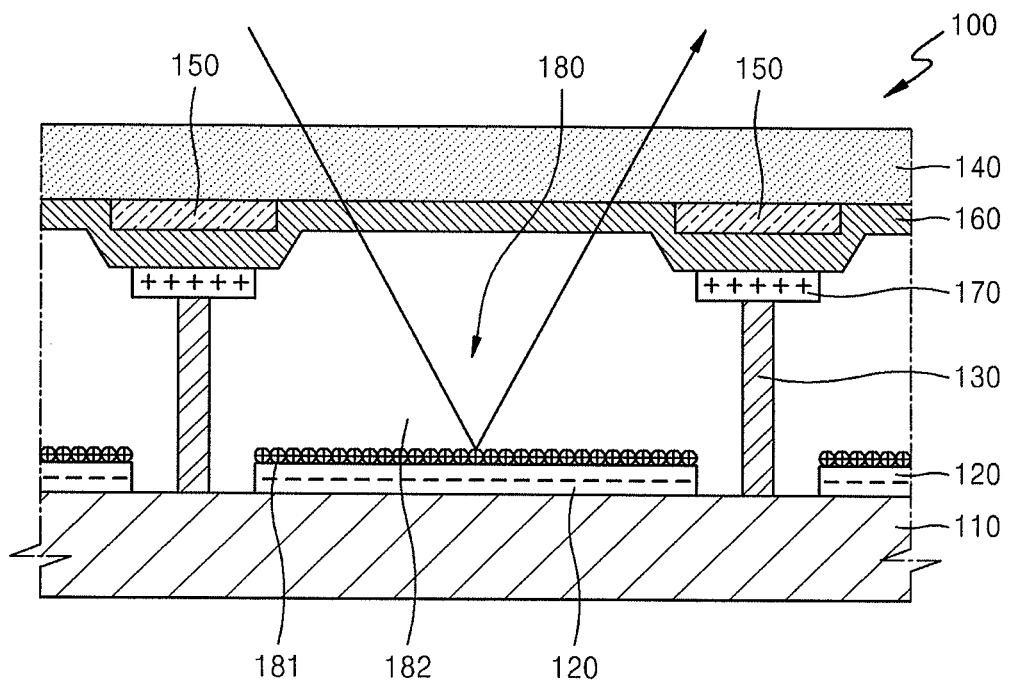
FIGS. 1 and 2 are schematic cross-sectional diagrams of a flat panel display apparatus according to an embodiment.
Figure 2:
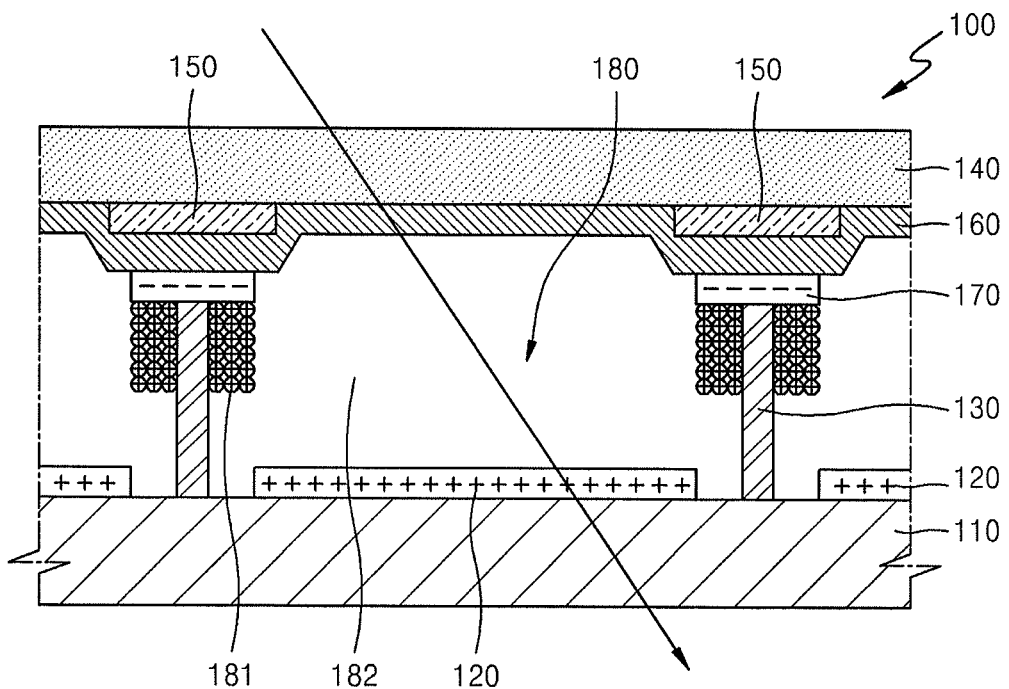
Figure 3:
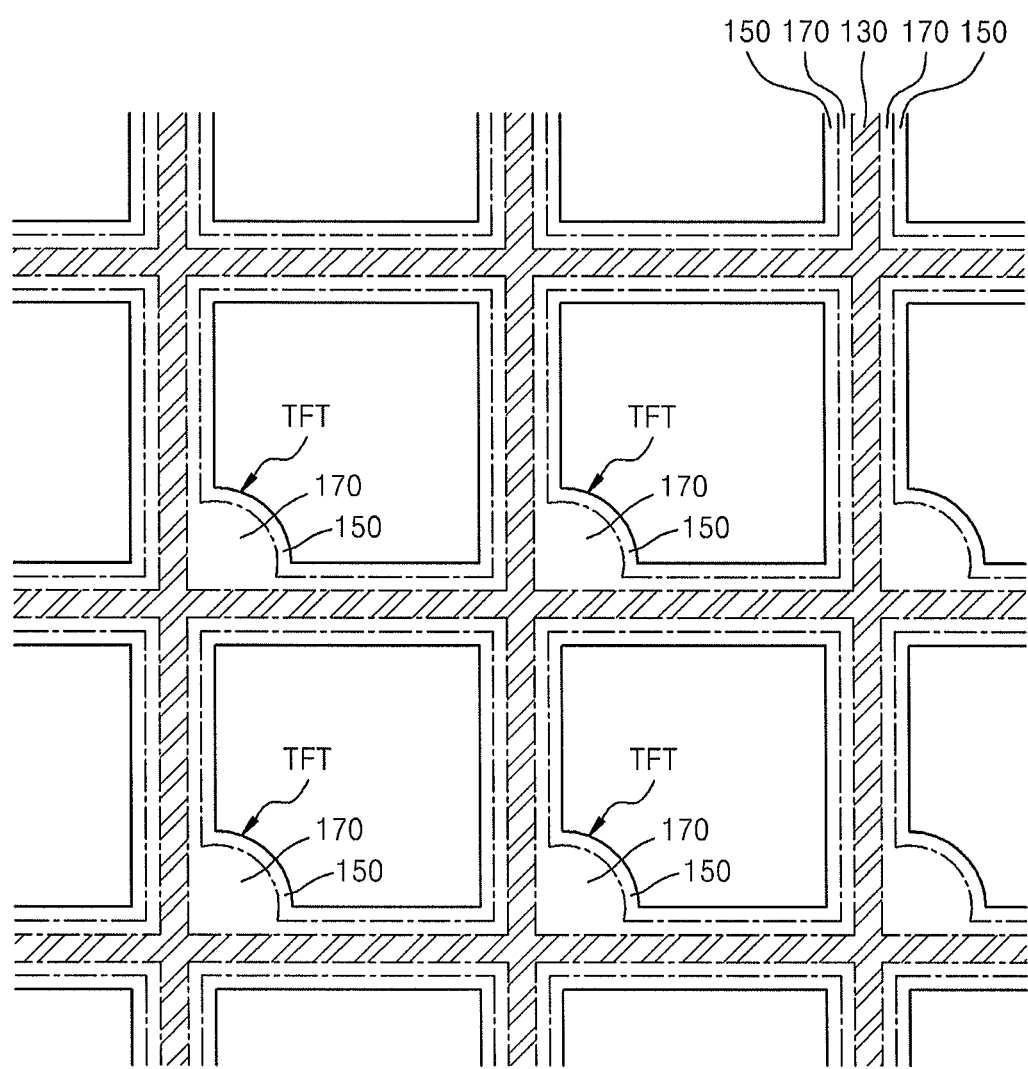
FIG. 3 is a top plan view of some elements of the flat panel display apparatus of FIGS. 1 and 2 according to an embodiment.

FIGS. 1 and 2 are schematic cross-sectional diagrams of a flat panel display apparatus 100 according to an embodiment. FIG. 3 is a top plan view of some elements of the flat panel display apparatus 100 of FIGS. 1 and 2 according to an embodiment. In FIGS. 1 and 2, the flat panel display apparatus 100 is illustrated with respect to one unit pixel, and in FIG. 3, the flat panel display apparatus 100 is illustrated with respect to a plurality of unit pixels.

Referring to FIGS. 1 and 2, the flat panel display apparatus 100 may include a first substrate 110, a second substrate 140 facing the first substrate 110, barrier walls 130 disposed between the first substrate 110 and the second substrate 140 and partitioning unit pixels, first electrodes 120 disposed on a surface of the first substrate 110 facing the second substrate 140 and disposed in respective unit pixels, black matrices 150 disposed on a surface of the second substrate 140 facing the first substrate 110 and corresponding to the barrier walls 130, and second electrodes 170 disposed between the first substrate 110 and the second substrate 140 and corresponding to the black matrices 150.

The first electrodes 120 may be separated from each other in the respective unit pixels on the first substrate 110. The barrier walls 130 partitioning the unit pixels may be disposed on the first substrate 110 between the separated first electrodes 120 and outside of the first electrodes 120.

The first substrate 110 may be formed of a transparent glass material having $SiO_2$ as a main component. In other implementations, the first substrate 110 may be formed of a transparent plastic material such as polyethylene terephthalate (PET), polycarbonate (PC), or polyimide (PI). If the first substrate 110 is formed of the transparent plastic material, a flexible display panel display apparatus may be easily provided.

Although not shown, the first substrate 110 may include a plurality of pixel circuits including at least one thin film transistor (TFT). One pixel circuit may be disposed per pixel. The TFTs may include a gate electrode, an active layer insulated from the gate electrode and having edges doped with impurities, and source and drain electrodes connected to both edges of the active layer doped with impurities. One of the source and drain electrodes included in the TFTs may be connected to at least a part of the first electrodes 120.

The first electrodes 120 may be formed on the first substrate 110. The flat panel display apparatus 100 of the present embodiment may operate in a transmission mode, and thus, the first substrate 110 and the first electrodes 120 may be formed of a transparent material. The first electrodes 120 may be formed of a transparent conductive material The transparent conductive material of the first electrodes 120 may include at least one of indium tin oxide (ITO), indium zinc oxide (IZO), zinc oxide (ZnO), indium oxide ($In_2O_3$), indium gallium oxide (IGO), and aluminum zinc oxide (AZO).

The first electrodes 120 may be patterned for each pixel. The barrier walls 130 partitioning the unit pixels may be disposed on the first substrate 110 between the first electrodes 120. The barrier walls 130 may function to partition the unit pixels and prevent light from leaking between the unit pixels. The barrier walls 130 may be formed of a photosensitive resin, a dry film, an acrylic resin, a polymer organic substance, etc., and may be formed by a photolithography process or a coating process.

The second substrate 140 may be disposed facing the first substrate 110. The black matrices 150 may be disposed corresponding to the barrier walls 130 and may function to prevent light from leaking between the unit pixels, similar to the barrier walls 130. The black matrices 150 may be formed of a material capable of blocking light and may include one of a metal thin film, metal particles, carbon black, and a mixture containing carbon black. The black matrices 150 may function to block light, and thus, may have a width greater than a distance between the first electrodes 120. However, if the black matrices 150 are too wide, an aperture ratio may be worsened. Accordingly, the width of the black matrices 150 may be appropriately determined.

An insulating layer 160 may be disposed covering the black matrices 150 over the entire area of the second substrate 140. The insulating layer 160 may be formed of a transparent inorganic insulating material or an organic insulating material such as an epoxy-series polymer, etc. The insulating layer 160 may perform a planarization function.

The second electrodes 170 may be disposed on the insulating layer 160 corresponding to the black matrices 150. The second electrodes 170 may be formed of a transparent conductive material or a metal material such as Ag, Al, Mg, Li, Ca, LiF/Ca, LiF/Al, Mo, Cr, Ti, Ta, etc. The second electrodes 170 may be disposed between the black matrices 150 and the barrier walls 130, and may be narrower than the black matrices 150 such that the second electrodes 170 are entirely covered by the black matrices 150 as seen from the outside.

The black matrices 150 and the second electrodes 170 may be separated from each other by the insulating layer 160. The insulating layer 160 may be formed of an inorganic or organic insulating material. In general, the black matrices 150 may be conductive, and thus, may be insulated from the second electrodes 170. However, if the black matrices 150 are formed of an electrically insulating material such as perylene, the insulating layer 160 may be omitted.

One of surfaces of the second electrodes 170 may contact the insulating layer 160, and other surfaces thereof may contact the barrier walls 130. The second electrodes 170 may be formed by depositing or sputtering a conductive material on the insulating layer 160 using a general method and patterning the deposited or sputtered insulating layer 160 by a photolithography process. The second substrate 140, in which the second electrodes 170 are formed, and the first substrate 110, in which the barrier walls 130 are formed, may be cohered to each other by using an adhesive agent such as an ultraviolet hardening adhesive agent, an epoxy-series adhesive agent, etc.

An electrophoretic dispersion solution 180 may be included in the unit pixels partitioned by the first substrate 110, the barrier walls 130, and the second substrate 140. The electrophoretic dispersion solution 180 may be implanted on the first substrate 110 with the barrier walls 130 by using methods such as die coating, casting, bar coating, dispensing, squeezing, inkjet printing, screen printing, etc. before the first substrate 110 and the second substrate 140 are cohered.

The electrophoretic dispersion solution 180 may include pigment particles 181 and a fluid 182 in which the pigment particles 181 are dispersed. The fluid 182 may be a liquid or a gas. If the fluid 182 is the liquid, the fluid 182 may include a low viscous material so that the pigment particles 181 may freely move in the fluid 182. For example, the fluid 182 may include an organic solvent such as a hydrocarbon, an aromatic hydrocarbon, a halogen solvent, etc. The fluid 182 may formed of an insulating substance so that the fluid 182 is not influenced by an electric field.

The pigment particles 181 may be white particles or colored particles. If the pigment particles 181 are white particles, the pigment particles 181 may include particles selected from titanium dioxide ($TiO_2$) particles, antimony trioxide ($Sb_2O_3$) particles, barium sulfate ($BaSO_4$) particles, zinc sulfide (ZnS) particles, and silicon dioxide ($SiO_2$) particles. If the pigment particles 181 are colored particles, the pigment particles 181 may include particles selected from yellow pigment particles, red pigment particles, green pigment particles, and blue pigment particles. The pigment particles 181 may be dispersed in the fluid 182, and may be positively charged (+) or negatively charged (−), Thus, if voltages are applied to the first electrodes 120 and/or the second electrodes 170, the pigment particles 181 may move in a specific direction according to the electric field.

FIG. 1 shows a state of the flat panel display apparatus 100 during a reflection mode. Referring to FIG. 1, if the pigment particles 181 are positively charged (+), negative power (−) may be applied to the first electrodes 120 and thus the pigment particles 181 may be disposed on the first electrodes 120 by the action of the electric field. In another implementation, the pigment particles 181 may be negatively charged (−). In this case, positive power (+) may be applied to the first electrodes 120.

In this regard, no power may be applied to the second electrodes 170 or the same polarity power as polarity of the pigment particles 181 may be applied to the second electrodes 170. If the same polarity power as applied to the pigment particles 181 is applied to the second electrodes 170, the pigment particles 181 dispersed in the fluid 182 by an electric field generated by the second electrodes 170 may be quickly disposed on the first electrodes 120.

If the pigment particles 181 are white particles, external light may be reflected by the pigment particles 181 and may form a white color. In this regard, a color filter (not shown) may be further disposed on the second substrate 140 so that a color is formed. If the pigment particles 181 are colored particles, a yellow color, a red color, a green color, or a blue color may be formed. The pigment particles 181 of different colors may be disposed in each unit pixel.

FIG. 2 shows a state of the flat panel display apparatus 100 during a transmission mode. Referring to FIG. 2, if the pigment particles 181 are positively charged (+), negative power (−) may be applied to the second electrodes 170, and thus, the pigment particles 181 may be disposed on the second electrodes 170 by the action of the electric field. However, in another implementation, the pigment particles 181 may be negatively charged (−). In this case, positive power (+) may be applied to the second electrodes 170.

In this regard, no power may be applied to the first electrodes 120 or the same polarity power as polarity of the pigment particles 181 may be applied to the first electrodes 120. If the same polarity power as applied to the pigment particles 181 is applied to the first electrodes 120, the pigment particles 181 dispersed in the fluid 182 by an electric field generated by the first electrodes 120 may be quickly disposed on the second electrodes 170.

The second electrodes 170 may be disposed in lower portions of the black matrices 150 and may have smaller widths than the black matrices 150. Thus, if the pigment particles 181 are attached to the second electrodes 170, the pigment particles 181 may be covered by the black matrices 150. Therefore, only a gas may be disposed in a region through which light of a pixel is transmitted when the electrophoretic dispersion solution 180 is a dry type, and only an organic solvent may be disposed in the region when the electrophoretic dispersion solution 180 is a wet type, thereby providing the transmission mode. The gas or the organic solvent may have a higher transmission rate than liquid crystals included in a liquid crystal display (LCD), thereby providing a transparent display apparatus having high transmission characteristics.

When a power supply is stopped during the reflection mode or the transmission mode, since the pigment particles 181 are charged, electric charges having an opposite polarity to that of the pigment particles 181 may be induced into the first electrodes 120 or the second electrodes 170 to which the pigment particles 181 are attached, resulting in a bistability state. Therefore, the reflection mode or the transmission mode may be continuously maintained, thereby achieving low power consumption.

Referring to FIG. 3, a plurality of unit pixels may be partitioned by the barrier walls 130 disposed in a mesh structure. TFTs may be included in a boundary of each unit pixel. As described above, one of the source and drain electrodes of each of the TFTs may be respectively electrically connected to the first electrodes 120. The elements that may be formed of transparent materials, such as the first substrate 110, the first electrodes 120, the second substrate 140, and the insulating layer 160, are not shown in FIG. 3.

The second electrodes 170 may be connected to the unit pixels along the barrier walls 130 partitioning the unit pixels. The barrier walls 130 and the second electrodes 170 may have mesh structures, as viewed, for example, in a horizontal cross-section. Thus, a common voltage Vcom may be simultaneously applied to the second electrodes 170 of a plurality of pixels.

The TFTs may be respectively disposed in each unit pixel to drive the flat panel display apparatus 100. A transmission rate of the flat panel display apparatus 100 may be reduced by the TFTs during the transmission mode, and the black matrices 150 and the second electrodes 170 may be further disposed in a region where the TFTs are disposed.

In the flat panel display apparatus 100 of the present embodiment, the pigment particles 181 may be hidden by the black matrices 150 during the transmission mode. The pigment particles 181 may be disposed in regions where the black matrices 150 are disposed, i.e. regions corresponding to the barrier walls 130, during the transmission mode. As described above, only a fluid may exist in display regions of the unit pixels, thereby providing the transparent display apparatus.

FIG. 4 is a schematic cross-sectional diagram of a flat panel display apparatus 200 according to another embodiment. The differences between the present embodiment with reference to FIG. 4 and the embodiment with reference to FIGS. 1 through 3 will now be described.

Referring to FIG. 4, first electrodes 220 may be disposed on a first substrate 210 and may be separated from each other with respect to each unit pixel. Third electrodes 221 may be disposed on the first substrate 210 where the first electrodes 220 are not disposed and may be spaced apart from the first electrodes 220. The third electrodes 221 may be formed of a same transparent conductive material as the first electrodes 220. When the third electrodes 221 are formed of the same transparent conductive material as the first electrodes 220, the first electrodes 220 and the third electrodes 221 may be simultaneously formed through one mask process. In another implementation, the third electrodes 221 may be formed of a different material from the first electrodes 220. For example, the third electrodes 221 may be formed of a metal material such as Ag, Al, Mg, Li, Ca, LiF/Ca, LiF/Al, Mo, Cr, Ti, Ta, etc.

FIG. 4 shows a state of the flat panel display apparatus 200 during a transmission mode. Pigment particles 281 may be positively charged (+). The same positive power (+) as polarity of the pigment particles 281 may be applied to the first electrodes 220. Negative power (−) may be applied to the third electrodes 221. Thus, the pigment particles 281 may move in a direction of the third electrodes 221 due to the action of an electric field generated in a horizontal direction, and the pigment particles 281 may become attached to the third electrodes 221. The third electrodes 221 may be disposed in regions corresponding to black matrices 250 that are disposed on a surface of a second substrate 240 facing the first substrate 210 and may have smaller widths than the black matrices 250. Thus, the pigment particles 281 may be hidden by the black matrices 250, thereby providing the transmission mode.

Although not shown, negative power (−) may be applied to the first electrodes 220, and positive power (+) may be applied to the third electrodes 221, so that the pigment particles 281 that are positively charged (+) may be disposed on the first electrodes 220 in the reflection mode.

Although the pigment particles 281 are positively charged (+) in the present embodiment, in another implementation, the pigment particles 281 may be negatively charged (−). Furthermore, although a second insulating layer 260 that covers the black matrices 250, and second electrodes 270 are disposed on the second substrate 240 in the present embodiment, in another implementation, the second insulating layer 260 and the second electrodes 270 may be omitted.

FIG. 5 is a schematic cross-sectional diagram of a flat panel display apparatus 300 according to another embodiment.

Referring to FIG. 5, fourth electrodes 390 may be further disposed between black matrices 350 and an insulating layer 360 that are sequentially formed on a surface of a second substrate 340 facing a first substrate 310. The fourth electrodes 390 may be formed on an overall surface of the second substrate 340 to cover the black matrices 350, and may include at least one transparent conductive material selected from indium tin oxide (ITO), indium zinc oxide (IZO), zinc oxide (ZnO), indium oxide ($In_2O_3$), indium gallium oxide (IGO), and aluminum zinc oxide (AZO).

The insulating layer 360 may be disposed on a surface of the fourth electrodes 390 facing the first substrate 310. The second electrodes 370 may be disposed on regions of the insulating layer 360 corresponding to the black matrices 350. The second electrodes 370 and the fourth electrodes 390 may be electrically connected to each other through via holes C included in the insulating layer 360. Thus, if voltages are applied to the fourth electrodes 390, the same voltages as applied to the fourth electrodes 390 may be applied to the second electrodes 370.

FIG. 5 shows a state of the flat panel display apparatus 300 during a reflection mode. Pigment particles 381 may be positively charged (+). Negative power (−) may be applied to first electrodes 320. Positive power (+) may be applied to the fourth electrodes 390, and thus, positive power (+) may be applied to the second electrodes 370 that are electrically connected to the fourth electrodes 390 through the via holes C. Thus, the pigment particles 381 may be disposed on the first electrodes 320, thereby providing the reflection mode.

Figure 6:
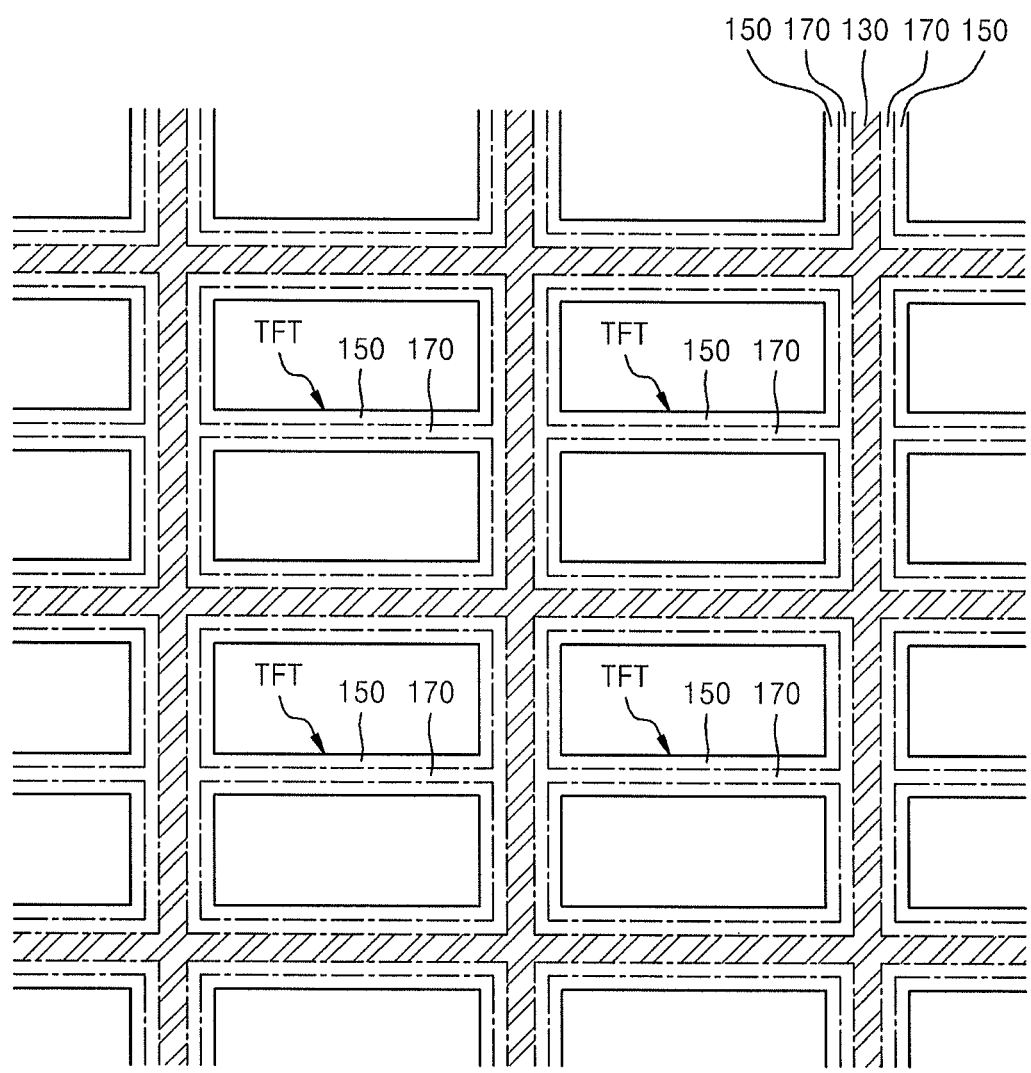
FIG. 6 is a top plan view of a modification of the flat panel display apparatus of FIG. 3 according to an embodiment.

FIG. 6 is a top plan view of a modification of the flat panel display apparatus 100 of FIG. 3 according to an embodiment.

Referring to FIG. 6, the elements of FIG. 6 are the same as those of FIG. 3, except for the TFTs. The TFTs may be disposed in a region of the first substrate 110 corresponding to a center portion of each unit pixel. The black matrices 150 and the second electrodes 170 may be disposed in the second substrate 140 corresponding to the TFTs.

The pigment particles 181 may be disposed on the second electrodes 170 by voltages applied to the second electrodes 170 during a transmission mode. Thus, the pigment particles 181 may be disposed in regions corresponding to the TFTs as well as regions corresponding to the barrier walls 130 during a transmission mode.

According to the structure described above, when a non-operation mode in which no voltage is applied to the first electrodes 120 and the second electrodes 170 is changed to the transmission mode or the reflection mode is changed to the transmission mode, a movement distance of the pigment particles 181 may be reduced. Thus, the non-operation mode or the reflection mode can be quickly changed to the transmission mode.

Figure 7:
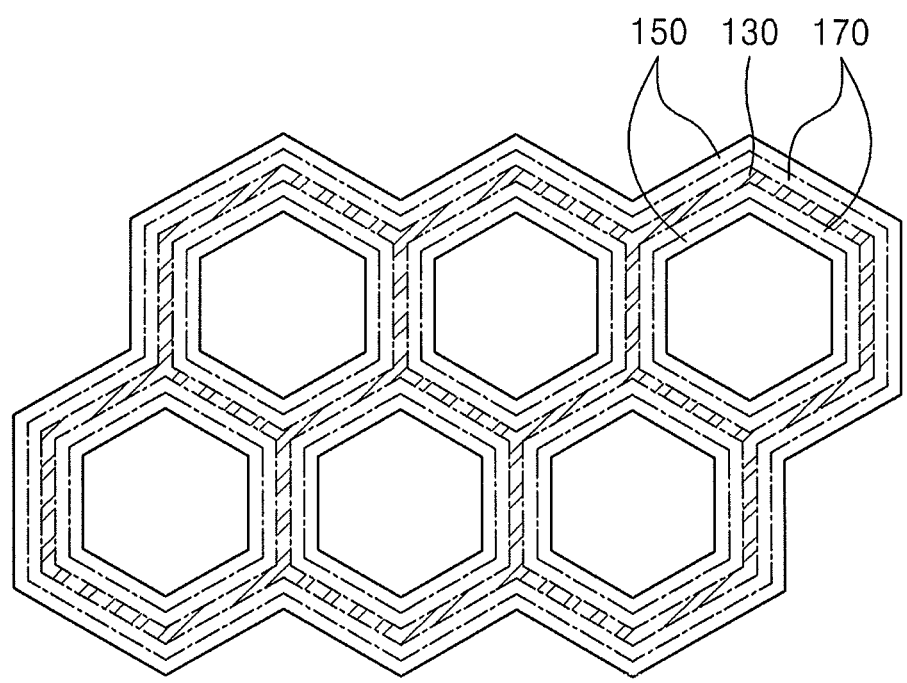
FIG. 7 is a top plan view of another modification of the flat panel display apparatus of FIG. 3 according to an embodiment.

FIG. 7 is a top plan view of another modification of the flat panel display apparatus 100 of FIG. 3 according to another embodiment.

Referring to FIG. 7, the barrier walls 130 partitioning unit pixels, the black matrices 150 disposed corresponding to the barrier walls 130, and the second electrodes 170 may have hexagonal shapes, and thus an aperture ratio may be increases. Surface areas of the black matrices 150 disposed corresponding to the barrier walls 130 partitioning unit pixels may be increased. Therefore, regions where the pigment particles 181 may be disposed may be increased during a transmission mode.

Although not shown, TFTs may be disposed corresponding to boundary regions of unit pixels.

By way of summation and review, electrophoretic display apparatuses typically use the characteristics that light is reflected or blocked by charged pigment particles. Accordingly, electrophoretic display apparatuses typically used as reflective display devices may be relatively inferior to liquid crystal display devices in terms of color quality, and thus it may be difficult to apply typical electrophoretic display apparatuses in various fields.

In this regard, the flat panel display apparatus according to the one or more embodiments described above represents an advance in the art in that the flat panel display apparatus may selectively operate in a reflection mode and a transmission mode.

The flat panel display apparatus may have a high aperture ratio and may be easily switched to a transmission mode.

While various aspects have been particularly shown and described with reference to embodiments thereof, it will be understood by those of ordinary skill in the art that various changes in form and details may be made therein without departing from the spirit and scope thereof as defined by the following claims.

What is claimed is:

1. A flat panel display apparatus, comprising:
a first substrate;
a second substrate disposed facing the first substrate;
barrier walls disposed between the first substrate and the second substrate and partitioning unit pixels;
first electrodes disposed on a surface of the first substrate facing the second substrate and located in the respective unit pixels;
black matrices disposed on the surface of the second substrate facing the first substrate and corresponding to the barrier walls;
second electrodes disposed in regions corresponding to the black matrices between the first substrate and the second substrate, the second electrodes being disposed between the black matrices and the barrier walls, and widths of the second electrodes being smaller than widths of the black matrices; and
an electrophoretic dispersion solution disposed in the unit pixels and including charged pigment particles and a fluid in which the charged pigment particles are dispersed.

2. The flat panel display apparatus of claim 1, further including third electrodes disposed on regions of the first substrate corresponding to the black matrices and spaced apart from the first electrodes.

3. The flat panel display apparatus of claim 1, further including an insulating layer disposed on an overall surface of the second substrate and covering the black matrices.

4. The flat panel display apparatus of claim 3, further including fourth electrodes disposed between the insulating layer and the second substrate.

5. The flat panel display apparatus of claim 4, wherein the second electrodes and the fourth electrodes are electrically connected to each other.

6. The flat panel display apparatus of claim 4, wherein the fourth electrodes are transparent electrodes.

7. The flat panel display apparatus of claim 1, wherein the first substrate and the second substrate are transparent substrates.

8. The flat panel display apparatus of claim 1, wherein the first electrodes are transparent electrodes.

9. The flat panel display apparatus of claim 1, wherein the second electrodes are metal electrodes.

10. The flat panel display apparatus of claim 1, wherein horizontal cross-sections of the barrier walls have a mesh structure, the second electrodes are disposed corresponding to the barrier walls, and a common voltage is applied to at least a portion of the second electrodes.

11. The flat panel display apparatus of claim 1, wherein horizontal cross-sections of the barrier walls have hexagonal shapes, and the black matrices and the second electrodes are disposed in the regions corresponding to the barrier walls.

12. The flat panel display apparatus of claim 1, wherein the first substrate includes thin film transistors (TFTs) respectively provided in each unit pixel and electrically connected to the first electrodes, wherein the TFTs are disposed corresponding to boundary regions of the unit pixels.

13. The flat panel display apparatus of claim 12, wherein the black matrices and the second electrodes are disposed in regions corresponding to the TFTs.

14. The flat panel display apparatus of claim 1, wherein the first substrate includes TFTs respectively provided in each unit pixel and electrically connected to the first electrodes, wherein the TFTs are disposed corresponding to center portions of the unit pixels.

15. The flat panel display apparatus of claim 14, wherein the black matrices and the second electrodes are disposed in regions corresponding to the TFTs.

16. A flat panel display apparatus, comprising:
a first substrate;
a second substrate disposed facing the first substrate;
barrier walls disposed between the first substrate and the second substrate and partitioning unit pixels;
first electrodes disposed on a surface of the first substrate facing the second substrate and located in the respective unit pixels;
black matrices disposed on the surface of the second substrate facing the first substrate and corresponding to the barrier walls;
second electrodes disposed in regions corresponding to the black matrices between the first substrate and the second substrate;
an insulating layer disposed on an overall surface of the second substrate and covering the black matrices,
fourth electrodes disposed between the insulating layer and the second substrate, and
an electrophoretic dispersion solution disposed in the unit pixels and including charged pigment particles and a fluid in which the charged pigment particles are dispersed.

* * * * *